United States Patent Office 3,109,857
Patented Nov. 5, 1963

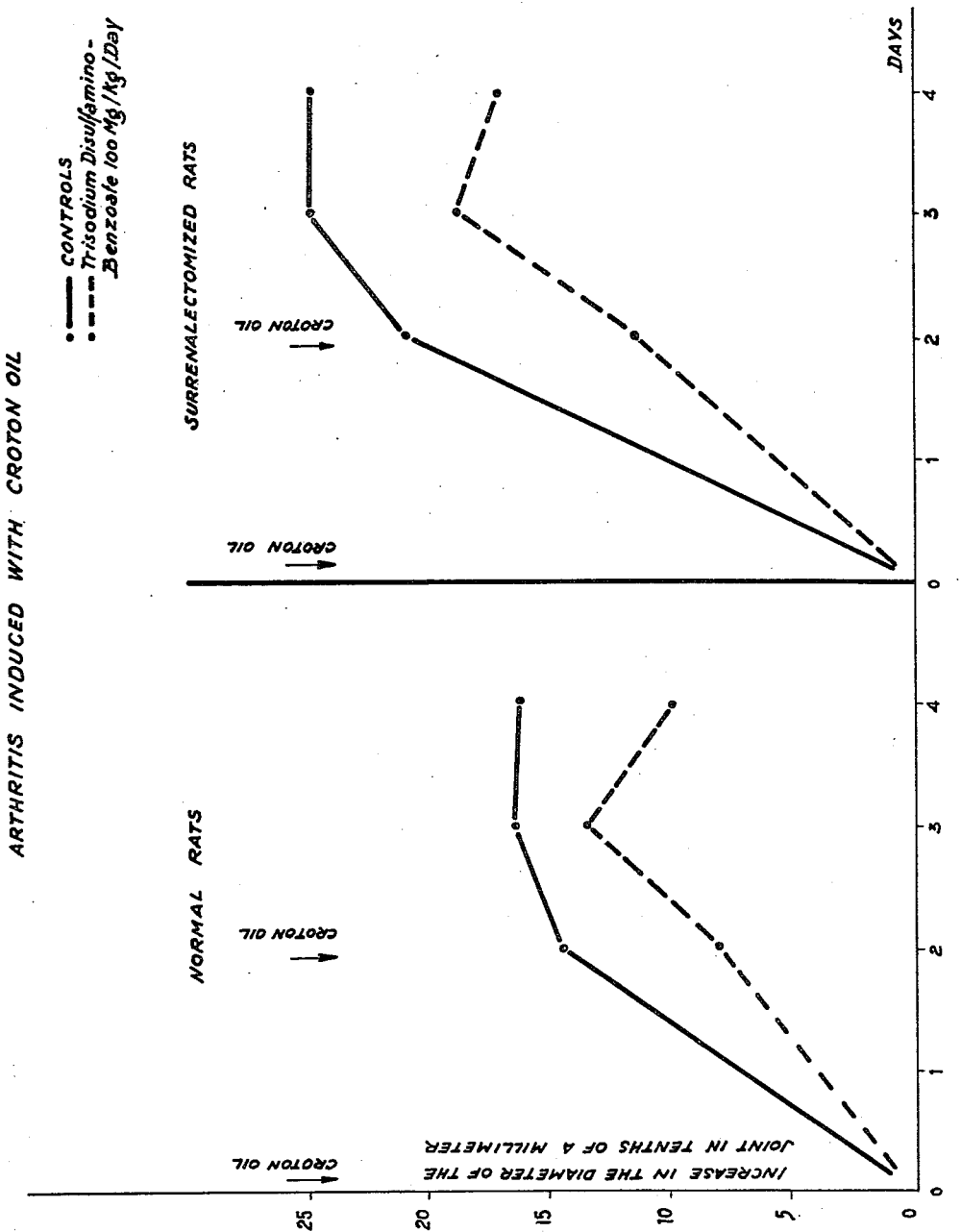

3,109,857
NON-TOXIC SALTS OF 3,5-DISULFAMINOBENZOIC ACID AND A PROCESS FOR THEIR PREPARATION
Gerard Nomine, Noisy-le-Sec, Michel Vignau, Neuilly-sur-Seine, and Lucien Penasse, Paris, France, assignors to Roussel-UCLAF, Societe Anonyme, Paris, France, a corporation of France
Filed Feb. 18, 1960, Ser. No. 9,621
Claims priority, application France Feb. 27, 1959
9 Claims. (Cl. 260—501)

This invention relates to a disulfamino substituted acid and its salts and a process for their preparation. More particularly, it relates to 3,5-disulfamino-benzoic acid as well as to its non-toxic mineral and organic salts.

The 3,4-disulfamino-benzoic acid and its non-toxic salts possess important anti-inflammatory properties.

The invention has for its object the obtention of 3,5-disulfamino-benzoic acid and its non-toxic salts.

Another object of the invention is the development of a method for the preparation of 3,5-disulfamino-benzoic acid and its non-toxic salts in a high degree of purity with good yields.

These and other objects of the invention will become more apparent as the description proceeds.

We have found, and this represents our invention the new and novel chemical compounds, 3,5-disulfaminobenzoic acid and its non-toxic salts. 3,5-disulfaminobenzoic acid and its non-toxic salts, especially the mineral and organic salts may be represented by the following general structural formula

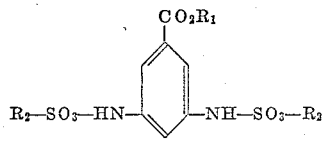

wherein $R_1$ and $R_2$ are selected from the group consisting of hydrogen, a non-toxic metallic radical and a non-toxic organic basic radical; with the proviso that when $R_1$ represents a non-toxic metallic radical or a non-toxic organic basic radical, $R_1$ and $R_2$ are identical.

The FIGURE shows a curve demonstrating anti-inflammatory action of trisodium disulfamino-benzoate.

The products according to the invention are obtained by reacting pyridinium sulfonic acid with 3,5-diaminobenzoic acid or its salts. The 3,5-disulfamino-benzoic acid thus formed is isolated by formation of an insoluble intermediate organic salt which is finally transformed into the desired salt in accordance with known methods.

In accordance with a preferred embodiment for the preparation of the products of the invention, chlorosulfonic acid is added to pyridine at a temperature in the neighborhood of 0° C. and preferably below 0° C. 3,5-diamino-benzoic acid in solution in pyridine or 3,5-diamino-benzoic acid hydrochloride in solution in a mixture of pyridine and dimethylformamide is added to the mixture of pyridinium sulfonic acid and pyridine at temperatures below room temperature and the oily phase is decanted. The 3,5-disulfamino-benzoic acid is isolated in the form of an insoluble salt with a high molecular weight quaternary ammonium compound such as benzyl-dimethyl - 2 - [2 - (p-1-1,3,3-tetramethylbutyl-phenoxy)-ethoxy]-ethyl ammonium chloride, hereinafter referred to by its commercial name "Hyamine 1622." This insoluble salt is transformed into the triethylamine salt or into any other non-toxic organic or mineral salt according to known methods.

If the direct isolation of 3,5-disulfamino-benzoic acid is attempted, very great difficulties are encountered in separating the pure substance from the sulfonation mixture. The preparation of the intermediate insoluble high-molecular weight quaternary ammonium salt makes it possible to overcome these difficulties, which was entirely unexpected, and this is one of the most characteristic features of the process according to the invention. In addition to commercial "Hyamine 1622," which is also known under the name of phemerol chloride or benzethonium chloride and has the empirical formula $$C_{27}H_{42}ClNO_2 \cdot H_2O$$

and the structural formula

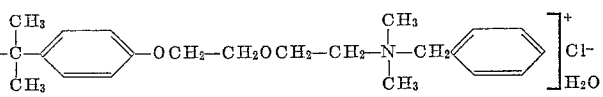

other high-molecular weight quaternary ammonium compounds capable of producing a water-insoluble salt by double decomposition may be used. Such compounds are, for example, "Hyamine 2389" described in the "Index of Modern Sulfonated Oils and Detergents" (vol. II) by J. P. Sisley, page 373 as being the chloride of a quaternary ammonium base, "Cequartyl BE" described on page 287 of the above mentioned Index as being "based on ammonium salts," "Arquad 2C" which, according to the same Index on page 261 is said to be dilauryl dimethyl ammonium chloride, and "Zephirol" which, according to the same Index on page 286 is said to be an alkyl dimethyl benzyl ammonium chloride.

If a non-toxic mineral salt of 3,5-disulfaminobenzoic acid is desired, it may advantageously be obtained from the triethylamine salt by double decomposition of the latter with an appropriate salt or also by displacement with a base. Thus, depending upon the selected mode of operation, it is possible to preferentially neutralize the two sulfamino radicals or the latter two as well as the carboxylic acid radical which is more difficult to neutralize.

As examples of non-toxic mineral salts can be mentioned the ammonium salt, the alkali metal salts, the alkaline earth salts, the non-toxic metallic salts with metals of the iron series, etc. Preferable are the trisodium salt of 3,5-disulfamino-benzoic acid, the tripotassium salt of 3,5-disulfamino-benzoic acid, the disodium salt of 3,5-disulfamino-benzoic acid.

As examples of non-toxic organic salts can be mentioned the trialkylamine salts such as the di-(triethylamine) salt of 3,5-disulfamino-benzoic acid, the mono- and di-alkylamine salts, etc.

As a variation of the process according to the invention, it is also possible to prepare the 3,5-disulfamino-benzoic acid as well as its salts by applying the Piria reaction to 3,5-dinitro benzoic acid. In order to accomplish this, the 3,5-dinitrobenzoic acid is treated with a mixed aqueous solution of sodium sulfite and sodium bisulfite and the 3,5-disulfamino-benzoic acid is isolated in the form of its "Hyamine 1622" salt. In this case the yields are lower than the yields obtained by sulfonation of 3,5-diaminobenzoic acid.

The following examples will serve to make the process of the invention more readily understood.

The examples are non-limiting. An entirely equivalent technique known to those skilled in the art may be employed without departing from the scope of the invention. In this manner, other solvents may be employed, the order of addition of reactants may be varied and the conditions of temperature and pressure may be varied.

EXAMPLE I

*Preparation of 3,5-Disulfoamino-Benzoic Acid and its Trisodium Salt*

(a) 3,5-DISULFAMINO-BENZOATE OF DI-(TRIETHYL-AMINE)

575 cc. of pyridine are cooled to a temperature below 0° C. in an atmosphere of nitrogen, and then 57.5 cc. of chlorosulfonic acid are added over a period of 1 hour. The temperature of the mixture containing the pyridinium sulfonic acid thus prepared is raised to +5° C. and then a solution of 50 gm. of 3,5-diamino-benzoic acid hydrochloride in 100 cc. of dimethylformamide and 200 cc. of pyridine are added over a period of 25 minutes. The mixture is agitated for 30 minutes, the oily phase is decanted and washed first with pyridine and then with ether, after having added water, and again with ether. Finally 3800 cc. of a 10% aqueous solution of "Hyamine 1622" hydrochloride are added over a period of 1 hour while stirring. The reaction mixture is vacuum filtered, the filter cake is washed by resuspending it in 2 liters of water and again vacuum filtering the suspension. The filter cake is dissolved in 1 liter of ethanol and the solution is evaporated to dryness in vacuo. The residue is taken up in 1750 cc. of butyl acetate. ¼ of the solvent is distilled off, 50 cc. of ethanol are added and then a mixture consisting of 1250 cc. of butyl acetate, 375 cc. of acetic acid and 375 cc. of triethylamine is added. The mixture is cooled with ice overnight, filtered, the filter cake is washed twice with 50 cc. aliquots of butyl acetate and then with 50 cc. of ethyl acetate. It is then dried in vacuo at 60° C. There is obtained 89 gm. of the crystallized acid di-(triethylamine) salt of 3,5-disulfamino-benzoic acid having a melting point of 236° C. The yield is 78% of theory.

This product has not previously been described.

*Analysis.*—$C_{19}H_{38}O_8N_4S_2$; molecular weight=514.65. Calculated: C, 44.34%; H, 7.44%; N, 10.89%; S, 12.46%. Found: C, 44.3%; H, 7.4%; N, 10.4%; S, 12.6%.

(b) SODIUM 3,5-DISULFAMINO-BENZOATE 2.27 gm. of triethylamine 3,5-disulfamino-benzoate prepared according to (a) above, are dissolved in 47 cc. of methanol. A solution of 800 mgm. of pelletized sodium hydroxide in 13 cc. methanol is slowly added thereto. The mixture is allowed to stand for 48 hours at room temperature. It is then vacuum filtered, the filter cake is washed 4 times with 5 cc. aliquots of methanol and is dried in vacuo at 150° C. 1.56 gm. (93% of theory) of the crystallized trisodium salt of 3,5-disulfamino-benzoic acid are obtained thereby.

This product is new.

*Analysis.*—$C_7H_5O_8N_2S_2Na_3$. Calculated: C, 22.22%; H, 1.33%; N, 7.40%; S, 16.95%; Na, 18.24%. Found: C, 22.5%; H, 1.6%; N, 7.3%; S, 16.6%; Na, 17.9%.

EXAMPLE II

*Preparation of the Tripotassium Salt of 3,5-Disulfamino-Benzoic Acid*

A solution of potassium acetate in methanol is added to a solution of the acid di-(triethylamine) salt of 3,5-disulfamino-benzoic acid, prepared according to the preceding example, in methanol.

The crystallized potassium salt is thus obtained with a yield of 98%. This salt is separated by vacuum filtration and dried.

Its melting point is higher than 300° C.

*Analysis.*—$C_7H_5N_2S_2O_8K_3$; molecular weight=426.55. Calculated: C, 19.71%; H, 1.18%; N, 6.57%; S, 15.03%; K, 27.5%. Found: C, 19.9%; H, 1.5%; N, 6.6%; S, 15.2%; K, 27.3%.

EXAMPLE III

*Preparation of the Acid Disodium Salt of 3,5-Disulfamino-Benzoic Acid*

A solution of sodium acetate in methanol is added to a solution of the acid di-(triethylamine) salt of 3,5-disulfamino-benzoic acid in methanol. The crystallized disodium salt is separated by vacuum filtration and dried and is obtained thereby with a quantitative yield.

*Analysis.*—Sulfuric ash: Calculated: 39.87%. Found: 40%.

As a comparison, we will now give the mode of operation for the preparation of the "Hyamine 1622" salt of 3,5-disulfamino-benzoic acid by the method of Piria, starting with 3,5-dinitrobenzoic acid.

EXAMPLE IV

*Preparation of the "Hyamine 1622" Salt of 3,5-Disulfamino-Benzoic Acid by the Method of Piria*

10 cc. of soda lye are added to 90 cc. of a concentrated solution of sodium bisulfite containing 481 gm. of sodium bisulfite per liter, and then 25 cc. of 2 N sodium hydroxide, 200 cc. of distilled water and 10.6 gm. of 3,5-dinitrobenzoic acid are added. The mixture is heated to the boiling point in an atmosphere of nitrogen, while stirring and heating is continued for 50 minutes. The reaction mixture is cooled and 750 cc. of a 10% solution of "Hyamine 1622" are added. The mixture is allowed to stand for 4 hours and then vacuum filtered. The filter cake is washed with iced water and dissolved in 160 cc. of methylene chloride. The organic solution is washed with water, dried over sodium sulfate and evaporated to dryness in vacuo. The "Hyamine 1622" salt of 3,5-disulfamino-benzoic acid is obtained thereby. This salt behaves in similar fashion to that obtained in Example I during its transformation into the triethylamine salt; however, it is obtained in less favorable yields.

EXAMPLE V

*Demonstration of the Anti-Inflammatory Action of the Trisodium Salt of 3,5-Disulfamino-Benzoic Acid*

In order to demonstrate the anti-inflammatory action of the non-toxic salts of 3,5-disulfamino-benzoic acid, trisodium 3,5-disulfamino-benzoate (R1003) produced according to Example I was tested on rats which were in an arthritic condition induced with croton oil (an adaptation of a technique of Selye).

24 young male rats weighing approximately 100 gm. each, of which 12 were normal and 12 were surrenalectomized, were divided into four groups of six rats each. All of the rats received an injection of 0.1 cc. of dilute croton oil implanted under the aponeurosis, both on day 0 and day 2.

In addition, the four groups received the following treatments:

(1) Normal controls: physiological serum, 2 cc./kg./day, subcutaneously.

(2) Normal rats: R1003, 100 mgm./kg./day, subcutaneously.

(3) Surrenalectomized controls: physiological serum, 2 cc./kg./day, subcutaneously.

(4) Surrenalectomized rats: R1003, 100 mgm./kg./day, subcutaneously in five daily injections (from day 0 to day 4, inclusive).

The average diameter of the tibiotarsal joint is determined on day 0, 2, 3 and 4 by means of a slide caliper.

The results are expressed in terms of the average increase of this diameter with reference to day 0 and are shown in the figure.

The changes in the diameter of the joint in the four groups of rats are shown in the figure. The higher arthritic reaction in the surrenalectomized rats is normal. The degree of protection obtained with R1003 is of the same order in the surrenalectomized rats as in the normal rats. In both cases it should be noted that there is a good degree of protection (45%) on day 2, that is, during the actute phase of the inflammation (this measurement was made two hours after the injection of croton oil).

In a test of the acute toxicity by intraperitoneal injection on mice the compound R1003 has been found to be devoid of any toxicity up to a dose of 1 gm./kg.

It can thus be seen that at a dose of 100 mgm./kg., the trisodium salt of 3,5-disulfamino-benzoic acid exhibits a great anti-inflammatory action in rats, while it is devoid of any toxic properties in mice up to a dose of 1 gm./kg.

The preceding examples were given purely for descriptive purposes. Such changes and modifications as would occur to one skilled in the art may be made without departing from the spirit of the invention. These and various other changes may be made without departing from the spirit of the invention or the scope of the appended claims.

We claim:

1. A 3,5-disulfamino-benzoic acid compound having the structural formula

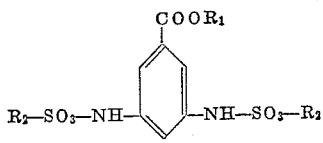

wherein $R_1$ and $R_2$ are selected from the group consisting of hydrogen and a non-toxic basic radical selected from the group consisting of ammonium, alkali metal, alkaline earth metal, trialkyl ammonium, dialkyl ammonium and monoalkyl ammonium, with the proviso that when $R_1$ represents said non-toxic basic radical selected from the group consisting of ammonium, alkali metal, alkaline earth metal, trialkyl ammonium, dialkyl ammonium and monoalkyl ammonium, $R_1$ and $R_2$ are identical.

2. The acid di-(triethylamine) salt of 3,5-disulfamino-benzoic acid.
3. The disodium salt of 3,5-disulfamino-benzoic acid.
4. The trisodium salt of 3,5-disulfamino-benzoic acid.
5. The tripotassium salt of 3,5-disulfamino-benzoic acid.
6. The benzyl - dimethyl - 2 -[2 - (p - 1,1,3,3 - tetramethyl - butyl - phenoxy) - ethoxy] - ethyl - ammonium salt of 3,5-disulfamino-benzoic acid.
7. The process of preparing a water-insoluble, high-molecular weight quaternary ammonium salt of 3,5-disulfamino-benzoic acid which comprises the steps of adding chlorosulfonic acid to pyridine at a temperature of about 0° C., adding the hydrochloride of 3,5-diamino-benzoic acid in solution in an inert organic solvent at a temperature below room temperature, separating the oily phase, mixing the said oily phase with an aqueous solution of a high-molecular weight quaternary ammonium compound capable of producing a water-insoluble salt with 3,5-disulfamino-benzoic acid by double decomposition and separating the said water-insoluble salt of 3,5-disulfamino-benzoic acid.
8. The process of claim 7, wherein the said high-molecular weight quaternary ammonium salt of 3,5-disulfamino-benzoic acid is reacted with a compound selected from the group consisting of trialkylamine, dialkylamine and monoalkyl amine to form a compound selected from the group consisting of the corresponding acid diammonium 3,5-sulfamino benzoate and the corresponding triammonium 3,5-disulfamino-benzoate.
9. The process of claim 8 wherein the said ammonium 3,5-disulfamino benzoate formed is reacted with a compound selected from the group consisting of an alkali metal salt and an alkaline earth metal salt to form the corresponding metal salt of 3,5-disulfamino-benzoic acid.

References Cited in the file of this patent

UNITED STATES PATENTS

| | | |
|---|---|---|
| 2,212,171 | Salzberg | Aug. 20, 1940 |
| 2,271,707 | Munz et al. | Feb. 3, 1942 |
| 2,527,810 | Goldberg et al. | Oct. 31, 1950 |
| 2,785,195 | Beck et al. | Mar. 12, 1957 |
| 2,789,132 | Surreau et al. | Apr. 16, 1957 |
| 2,836,620 | Bersworth et al. | May 27, 1958 |

FOREIGN PATENTS

| | | |
|---|---|---|
| 372,389 | Great Britain | Apr. 28, 1932 |

OTHER REFERENCES

Weil et al.: Ber. Deut. Chem., vol. 55, pages 732–737 (1922).

Weil et al.: Ber. Deut. Chem., vol. 55, pages 2533–2542 (1922).

Butler et al.: J.A.C.S., vol. 61, pages 914–915 (1939).

Holmes et al.: American Chemical Journal, volume 13, pages 371–384 (1891).